May 10, 1949.    P. L. NEWBOLD    2,469,983
GRASS SHEARS
Filed April 19, 1946
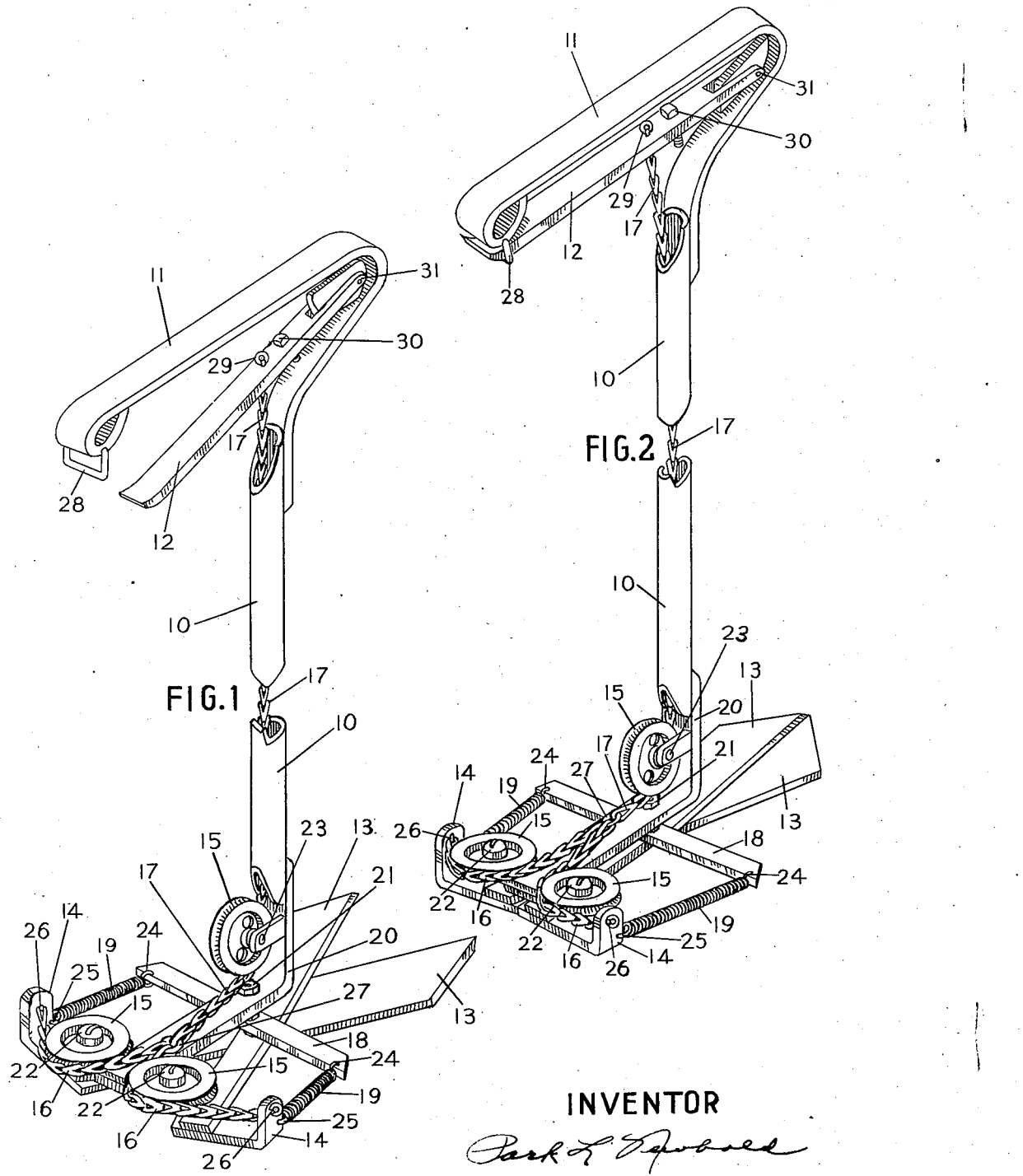
INVENTOR Patented May 10, 1949

2,469,983

UNITED STATES PATENT OFFICE 2,469,983

GRASS SHEARS

Park L. Newbold, Cedar Rapids, Iowa

Application April 19, 1946, Serial No. 663,511

2 Claims. (Cl. 30—248)

This invention relates to a shears for trimming grass around trees, walks, buildings, fences or other purposes to which it may be adapted.

It is the object of my invention to provide a device of simple and inexpensive construction so that the operation may cut grass while in an upright position.

Another object of my invention is to provide a device that is easy to operate, well balanced and does not require frequent adjustment.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims without departing from the spirit of the invention.

Figure 1 is a view of my device in open position and showing the position of the operating lever in relation to the cutting blades.

Figure 2 is a view of the device in closed position and show in particular the rearward ends of the blades and cooperating effect of the pulleys and opening springs.

Referring now to the drawings, a preferred embodiment of my invention includes shears indicated generally at 13, operating pulleys 15, connecting chain 17, upright handle support 10 and operating lever 12.

The blades 13 are held together by bolt 21 and engaged to the base 20. At the rear of the blades 13 are attached members 14 to which the operating chains 16 are engaged at 26. Opening springs 19 are attached to the rearward blade members 14 at 25 and attached to the anchoring bar 18 at 24.

Twin operating pulleys 15 are attached to the rearward of base 20 at 22 and a single pulley 15 is engaged to the front upper part of the base at 23. A main operating chain 17 is attached to lever 12 at 29 thence through handle support 10, over forward pulley 15 at 23 and attached to chains 16 at 27.

A lever 12 is attached to the handle 11 at 31. There is also a clip 28 for holding lever 12 in closed position and an adjusting screw 30.

I have referred to 16 and 17 as operating chains and preferably use this type of connection, however, it is understood that ropes or other flexible means may be used.

In use the operator places his hand on the handle 11 with his fingers extended over lever 12 in open position. As lever 11 moves upward it causes chains 16 and 17 to move over pulleys 15 effecting closing of blades 13 and expansion of springs 19. As the lever 12 is released the springs 19 retracts to normal position thereby reopening the blades 13 to cutting position.

I claim as my invention:

1. In a grass shears, the combination of a pair of blades pivoted together and attached to an angled base which extends rearward and upward, a handle attached to the elongated upward part of the base, a lever attached to the handle, a single pulley attached to the forward part of the base and adjacent to the angle, a pulley engaged to the left rearward part of the base, a pulley engaged to the right rearward part of the base, a horizontal stationary member engaged to the forward part of the base a pair of springs engaged to rearward ends of the blades and anchored to the stationary member, a flexible connecting means secured to the rearward end of each of the blades and extending over the adjacent cooperating pulleys to converge and connect with a single flexible means extending under the single forward pulley and upward to engage the operating lever so that a movement of the lever upwards will cause the blades of the shears to close, and a reverse action be produced by the retraction of the closing springs.

2. In a grass shears the combination of a pair of blades pivoted together in such a manner that closing of their rearward ends causes a likewise closing of their forward points; a base to which is attached at the rearward a pair of pulleys placed one to the left of center and one to the right of center, a single pulley placed at the forward part of the base proper, a pair of springs attached to the rear ends of the blades, an anchorage arm placed horizontally and at right angles to the base said springs secured to the anchorage arm, a handle engaged to the forward and upper elongated end of the base proper, a lever attached to the handle, an adjusting screw placed in the lever to regulate movement, a clip attached to the handle to hold the lever in closed position, a flexible connecting means attached to the handle lever, thence under the front single pulley to engage a flexible connecting means extending over the two rearward pulleys to engage the rear ends of the blades.

PARK L. NEWBOLD.

REFERENCES CITED

The following references are of record in the file of this patent:

UNITED STATES PATENTS

| Number | Name | Date |
|---|---|---|
| 1,869,295 | Atterbury | July 26, 1932 |